United States Patent
Coutant

Patent Number: 6,047,180
Date of Patent: Apr. 4, 2000

[54] RADIO TRANSMISSION SYSTEM COMPRISING MOBILE TELECOMMUNICATION STATIONS, METHOD FOR CONNECTING TO SUCH A SYSTEM AND MOBILE STATION IN WHICH SAID METHOD IS IMPLEMENTED

[75] Inventor: François Coutant, Teloche, France

[73] Assignee: U.S. Philips Corporation, New York, N.Y.

[21] Appl. No.: 08/946,782

[22] Filed: Oct. 8, 1997

[30] Foreign Application Priority Data

Oct. 16, 1996 [FR] France .................................. 96 12629

[51] Int. Cl.⁷ ..................................... H04B 1/16
[52] U.S. Cl. .......................... 455/434; 455/426; 455/436; 455/502
[58] Field of Search ............................. 455/62, 434, 437, 455/515, 525, 574, 426, 436, 442, 502; 375/356; 370/503; 445/405, 435, 406

[56] References Cited

U.S. PATENT DOCUMENTS

| 5,142,695 | 8/1992 | Roberts et al. .......................... 455/437 |
| 5,179,559 | 1/1993 | Crisler et al. ............................ 455/437 |
| 5,410,733 | 4/1995 | Niva et al. ............................... 455/437 |
| 5,418,839 | 5/1995 | Knuth et al. ............................ 455/574 |
| 5,491,837 | 2/1996 | Haartsen ................................... 455/62 |
| 5,722,072 | 2/1998 | Crichton et al. ........................ 455/437 |
| 5,722,073 | 2/1998 | Wallstedt et al. ....................... 455/437 |
| 5,732,352 | 3/1998 | Gutowski et al. ...................... 455/437 |
| 5,754,956 | 5/1998 | Abreu et al. ............................ 455/434 |
| 5,862,130 | 1/1999 | Tat et al. ................................. 455/437 |
| 5,896,570 | 4/1999 | Saunders et al. ....................... 455/525 |
| 5,915,214 | 6/1999 | Reece et al. ............................ 455/406 |

*Primary Examiner*—William G. Trost
*Assistant Examiner*—Quochien Ba Vuong
*Attorney, Agent, or Firm*—Dicran Halajian

[57] ABSTRACT

A communication system is disclosed having a mobile unit connectable to different networks. The mobile unit is subscribed to a subscriber network which is one of these different networks. The mobile unit is connected to the subscriber network when establishing a call. The mobile unit includes an analysis circuit for producing data related to the different networks. A communication circuit of the mobile unit communicates the data to a user for selecting an optimal network from the different networks to establish a call. The data includes time periods the mobile unit is synchronized to each of the different networks. The optimal network has the longest synchronized time period or the lowest cost.

11 Claims, 3 Drawing Sheets

RADIO TRANSMISSION SYSTEM COMPRISING MOBILE TELECOMMUNICATION STATIONS, METHOD FOR CONNECTING TO SUCH A SYSTEM AND MOBILE STATION IN WHICH SAID METHOD IS IMPLEMENTED

FIELD OF THE INVENTION

The invention relates to a radio transmission system to which is connected at least one mobile telecommunication station for a subscriber who has to move in coverage areas belonging to the communication system and in coverage areas belonging to other systems, the mobile station comprising:

connection means for connection to another system, analysis means for producing transmit data relating to other systems which comprise system detection means, communication means for communicating transmission results to inform the subscriber of the result of the transmission analyses.

The invention also relates to a method implemented in a mobile station and also a mobile station in which the method is implemented.

BACKGROUND OF THE INVENTION

Such a system may be a system of the GSM type, which provides the possibility for a subscriber possessing such a mobile station to connect to another system than the one it is initially connected to by subscription. In GSM terms this is called roaming. On this subject could notably be consulted the publication: "The GSM System for Mobile Communication" by Michel Mouly and Marie-Bernadette Pautet, published by the authors whose address is 4 rue Élisée Reclus. F-91120 France.

The problem with which the subscriber is confronted is that of determining, even without the roaming procedure, another system that is suitable for him and of which he could take a subscription. Although the subscriber already has an initial communication system, he could be tempted to be connected to another system that would suit him better, for example, he could choose a system that offers a less costly subscription. However, he is not to forget that this less expensive system is to have a sufficiently large radio coverage area to satisfy his needs for communication when he moves.

SUMMARY OF THE INVENTION

The present invention proposes a system of the type defined in the opening paragraph, which provides the subscriber with indications that permit him to connect to the system on good grounds.

Therefore, such a system is characterized in that it comprises timing means assigned each to a system detected by said detection means.

Thus, thanks to the invention, the user has the disposal of statistics relating to the duration of accessibility of each system he can deal with.

These and other aspects of the invention will be apparent from and elucidated with reference to the embodiments described hereinafter.

DESCRIPTION OF PREFERRED EMBODIMENTS

Figure 1:
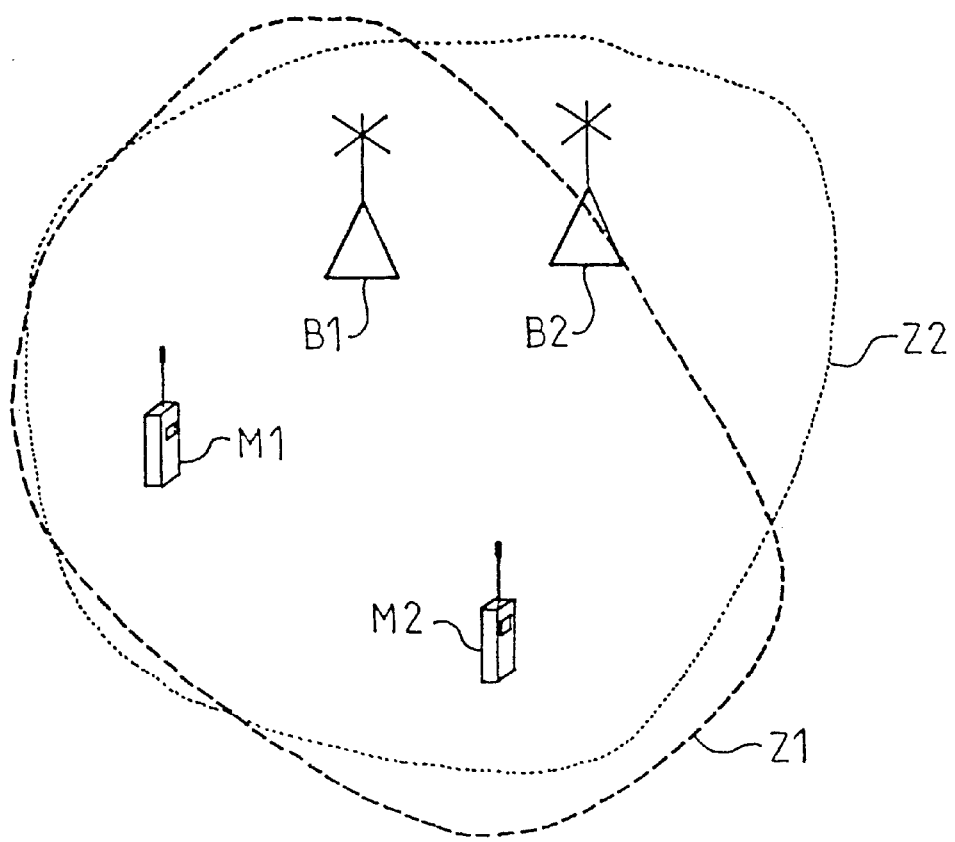
FIG. 1 shows a system according to the invention.

In FIG. 1 is shown in a diagram a first transmission system (or network) of the GSM type. It will be recollected that this system is a cellular system which implies a coverage area formed by cells. Each cell has a frequency plane or a frequency channel which is repeated every seven cells for hexagonally formed cells. In FIG. 1, the system shown is notably formed by a base transceiver station B1 serving as an intermediary for all the communications in which at least one of the two mobile stations is involved: M1 or M2. These mobile stations M1 and M2 are located in the coverage area Z1 of the base transceiver station B1. This zone is marked off in FIG. 1 by a dashed line Z1. As will often happen in practice, the mobile stations may be located in coverage areas belonging to networks to which they have not taken a subscription. For example, as is shown in the Figure, the mobile stations M1 and M2 are also located in the coverage area Z2 of another base transceiver station B2 of a system that is different from that of station B1 and which could also give satisfaction to the user.

Figure 2:
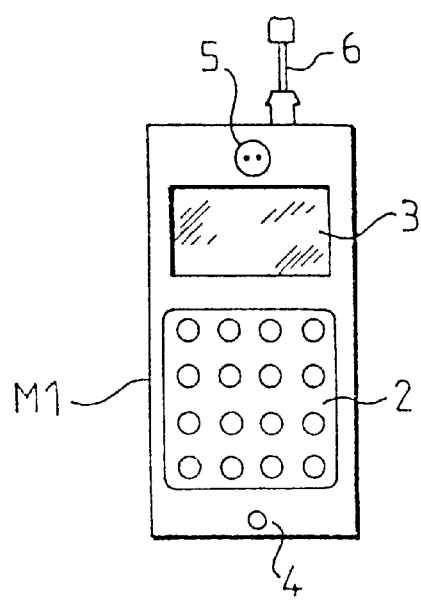
FIG. 2 shows a mobile telecommunication station in accordance with the invention.

In FIG. 2 is shown the mobile station M1 according to the invention. It comprises, as is customary, a keyboard 2, a screen 3, a microphone 4, a loudspeaker 5 and an antenna 6. This station operates with an electric arrangement which is shown in FIG. 3.

Figure 3:
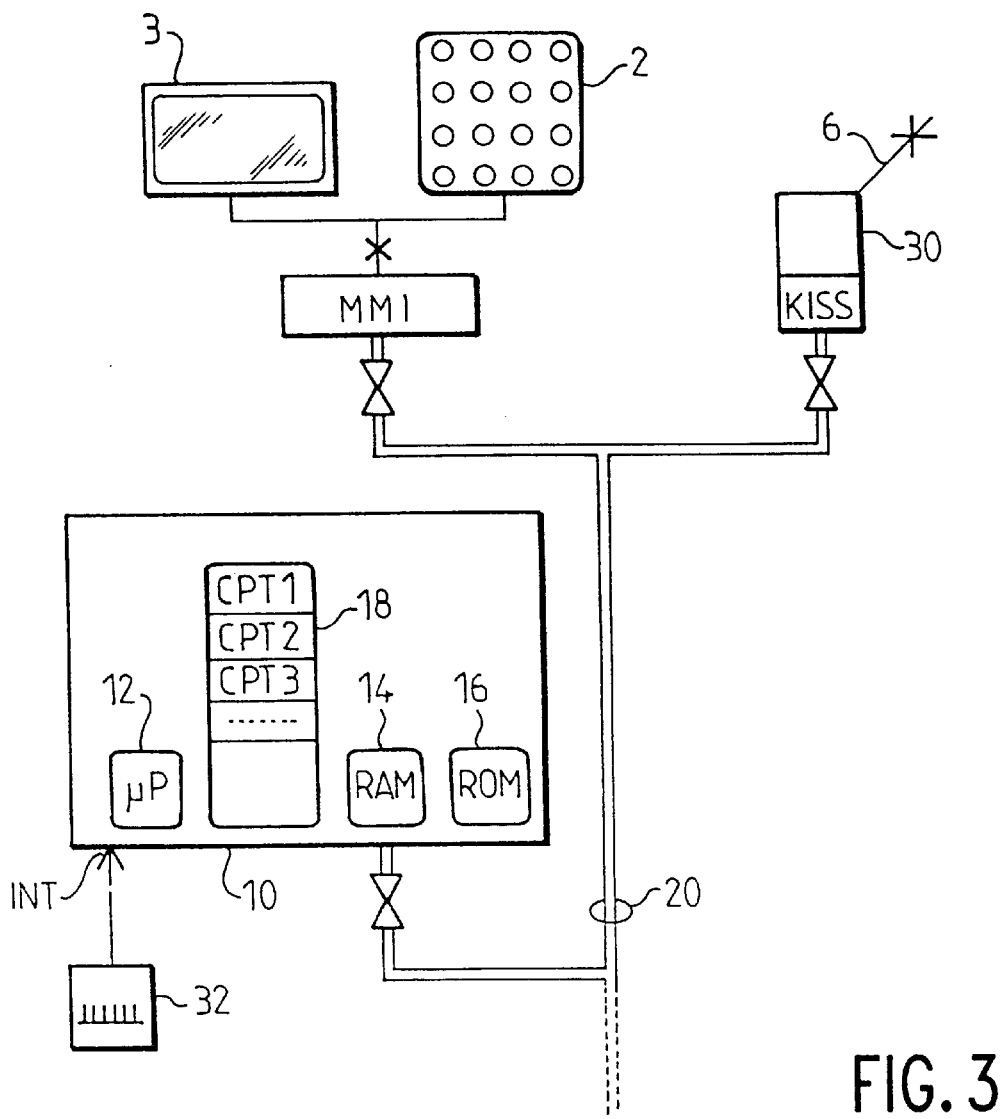
FIG. 3 shows the structure of the electrical connection in said mobile station.

This FIG. 3 shows the structure of the electric arrangement of the mobile station M1. This arrangement is formed by a microprocessor assembly 10 comprising an actual microprocessor 12, a RAM memory 14, a ROM memory 16 and a memory of the EEPROM type 18 which makes it possible to store and retain data, even the faintest station. The data processed by this assembly 10, or still to be processed by this assembly 10 are transported over a common data line 20 which is connected to the keyboard 2 and to the screen 3 via a Man-Machine Interface MMI and which is also connected, for example, to the transceiver circuit 30 via a radio control interface KISS.

According to the invention, locations CPT1, CPT2, CPT3 . . . which are used for supplying indications are provided in the memory 18 for the period of time during which the user could have been connected to another network than the one to which the user is subscribed. These memories CPT1, CPT2, CPT3, . . . , are incremented in timing with a clock 32 which produces signals on an interrupt input INT when this is authorized, so that an interrupt program is executed for incrementing them or not.

Figure 4:
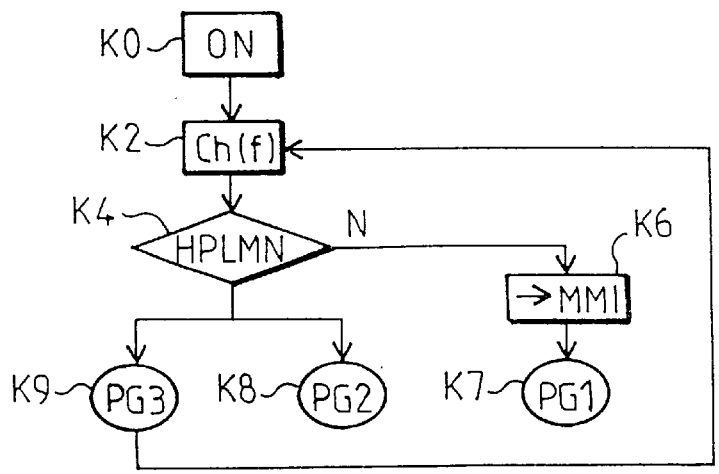
FIG. 4 shows a first operation flow chart of a mobile station according to the invention.

FIG. 4 shows the operation flow chart of the mobile station according to the invention.

This flow chart comprises a box K0 which indicates the start of the station.

According to normal operation of a mobile GSM station, the interface KISS searches, as is indicated in box K2, for the channels (frequencies) by analyzing their levels. The channels having a sufficiently high level are considered. Then, in box K4, an attempt is made at connecting to the network to which one is subscribed: HPLMN. If one does not arrive there, a message is sent to the interface MMI to signal this fact, box K6. After this, one proceeds to box K7 which indicates that a stand-by program PG1 is followed.

If one arrives at connecting to the network to which the user is subscribed, two programs PG2 (box K8) and PG3 (box K9) are executed in parallel. The program PG2 is the program which manages the communication and other customary functions of the mobile station. As this program does not form part of the present invention, it will not be described in detail. The program PG3 will be explained with the aid of the flow chart shown in FIG. 5.

Box K10 indicates the operation which comprises determining the other networks PLMN which it is possible to deal with. A list of these PLMNs is thus created. The next operation indicated in box K12 is the operation via which it is verified whether there is still synchronization with the network to which one has taken a subscription (HPLMN). Then, one seeks, or verifies, the synchronization with "the best cell" of each PLMN, that is to say, with the frequency channel received best (box K14). If synchronization has been established, or if one reaches synchronization, a timing counter for the timing relative to the PLMN is authorized to be incremented. Therefore, a flag DCPTi relating to the PLMNi is processed in position .T. (box K16). If not, the contents of this counter are fixed. The flag is put in position .F. (box K18). Then, in box K20, which follows the loss of synchronization detected in box K14, synchronization is established with the same PLMN, but in the neighboring cell whose frequencies are known because they were transmitted during a previous synchronization. If, finally, the latter synchronization is obtained, then the counter assigned to this PLMN is authorized to be incremented (box K22). If the latter synchronization is not obtained with a neighboring cell, the whole spectrum of frequency channels is then searched (box K24). This search is continued either until the respective PLMN is found, thus the counter still assigned to this same PLMN is authorized to be incremented (box K26), or until there has been decided that the search for this PLMN is unsuccessful and thus the contents of the counter assigned to this PLMN are fixed (box K28). The processing which has been described with respect to box K14 is effected for the PLMNi contained in the table established in box K10. This is indicated by box K32.

Figure 5:
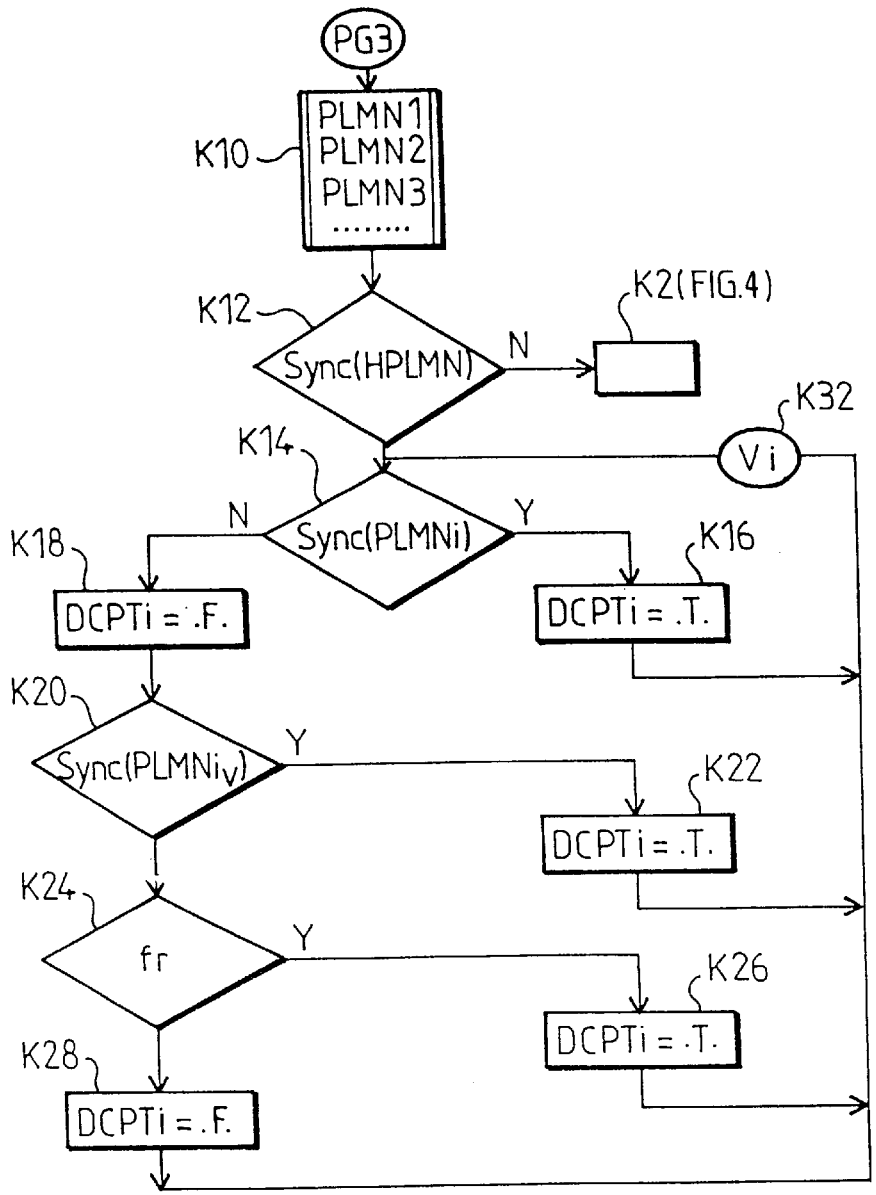
FIG. 5 shows a second operation flow chart of a mobile station according to the invention.

The program of FIG. 5 is run in a continuous manner, in parallel with other operation programs of the mobile station.

Figure 6:
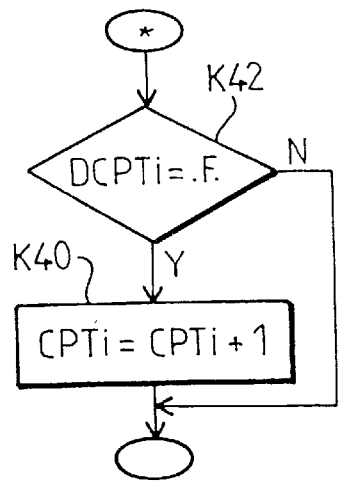
FIG. 6 shows the flow chart which permits of incrementing the timing counters.

FIG. 6 shows the flow chart which explains the manner in which the timing counters CPTi are incremented or not (box K40) as a function of the value of the flags which are assigned thereto DCPTi (box K42).

By working with this keyboard, the user can find back the contents of these counters with, opposite, the name of the network PLMN, which gives him a statistical table of the networks to which he is likely to connect. And from there, he has the choice of subscribing to another provider knowing that this provider can give him good service.

On the screen will be seen:
the total time during which a mobile station is working,
the total time for each PLMN found,
the reset-to-zero of these counters,
the result as a percentage.

An advantage provided by the invention is that the user who is abroad will be aided during the roaming procedure to select automatically the network that has most chance of being available for the longest period of time.

The user may also keep a list of preferential PLMNs updated thanks to the measures recommended by the invention.

I claim:
1. A radio communication system comprising:
a plurality of networks; and
a mobile unit capable of synchronizing with said plurality of networks, said mobile unit being subscribed to a subscriber network which is one of said plurality of networks; said mobile unit being connected to said subscriber network for establishing a call;
said mobile unit including analysis means for producing data related to periods of time in which said mobile unit is synchronized to said plurality of networks, and communication means for communicating said data to a user such that said user may select an optimal network from said plurality of networks; wherein synchronization is the ability of the mobile unit to receive a frequency channel with a sufficient high level from said plurality of networks.

2. The radio communication system of claim 1, wherein said optimal network has a longest of said time periods.

3. The radio communication system of claim 1, wherein said communication means communicates one of total available time for each of said plurality of networks and percentage of said available time for each of said plurality of networks with respect to an enabled time of said mobile unit.

4. The radio communication system of claim 1, wherein said mobile unit includes counters, each corresponding network of said plurality of networks being associated with a corresponding counter of said counters, each of said corresponding counters being enabled when synchronization between said mobile unit and said corresponding network is established.

5. A radio communication system comprising:
a plurality of networks; and
a mobile unit capable of synchronizing with said plurality of networks, said mobile unit including analysis means for producing data related to periods of time in which said mobile unit is synchronized to said plurality of networks, and communication means for communicating said data to a user such that said user may select an optimal network of said plurality of networks, said data including time periods said mobile unit is synchronized to each of said plurality of networks;
wherein synchronization is the ability of the mobile unit to receive a frequency channel with a sufficient high level from said plurality of networks.

6. The radio communication system of claim 5, wherein said optimal network has a longest of said time periods.

7. The radio communication system of claim 5, wherein said communication means communicates one of total available time for each of said plurality of networks and percentage of said available time for each of said plurality of networks with respect to an enabled time of said mobile unit.

8. The radio communication system of claim 5, wherein said mobile unit includes counters, each corresponding network of said plurality of networks being associated with a corresponding counter of said counters, each of said corresponding counters being enabled when synchronization between said mobile unit and said corresponding network is established.

9. A method of choosing an optimal network from a plurality of networks for connecting to a mobile unit to establish a call comprising:

synchronizing said mobile unit with said plurality of networks;

counting time periods said mobile unit remains synchronized with said plurality of networks; and selecting said optimum network of said plurality of networks based on said time periods: wherein synchronization is the ability of the mobile unit to receive a frequency channel with a sufficient high level from said plurality of networks.

10. The method of claim 9, further including providing one of available time for each of said plurality of networks and percentage of said available time for each of said plurality of networks with respect to an enabled time of said mobile unit.

11. The method of claim 9, wherein said optimal network has a longest of said time periods.

* * * * *